(No Model.)
W. H. COWDERY.
METHOD OF MAKING RAKES.
No. 481,663. Patented Aug. 30, 1892.
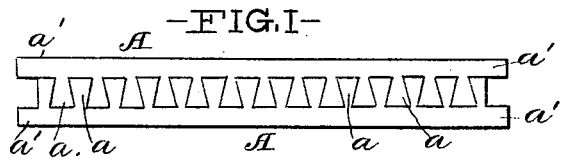
FIG. I
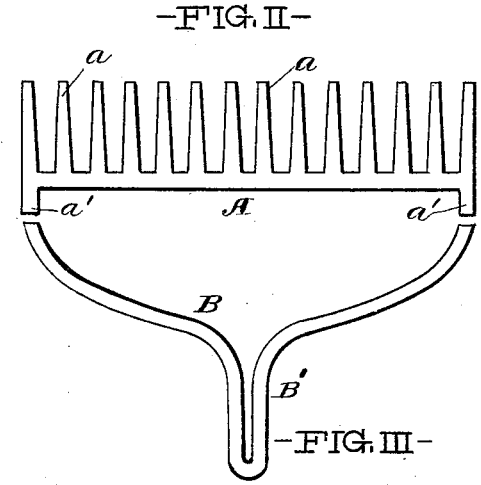
FIG. II
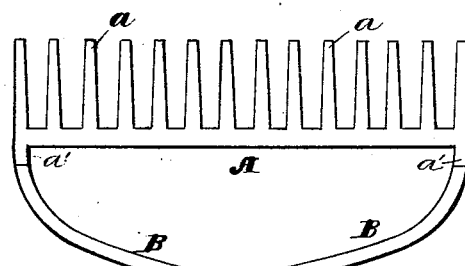
FIG. III
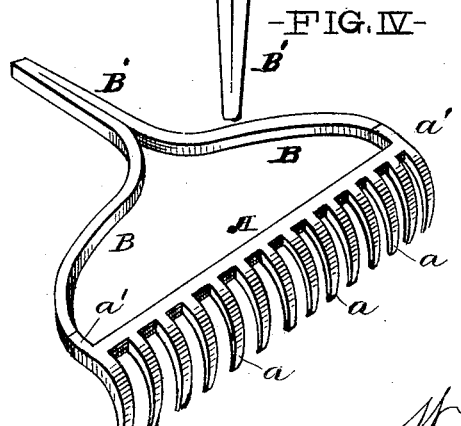
FIG. IV
WITNESSES:
J. C. Turner
Wm Lecher
INVENTOR.
W. H. Cowdery
BY Hall and Fay
ATTORNEYS.

UNITED STATES PATENT OFFICE.

WARREN H. COWDERY, OF ASHTABULA, OHIO.

METHOD OF MAKING RAKES.

SPECIFICATION forming part of Letters Patent No. 481,663, dated August 30, 1892.

Application filed November 17, 1891. Serial No. 412,152. (No model.)

*To all whom it may concern:*

Be it known that I, WARREN H. COWDERY, a citizen of the United States, and a resident of Ashtabula, county of Ashtabula, and State of Ohio, have invented certain new and useful Improvements in Methods of Making Rakes, of which the following is a specification, the principle of the invention being herein explained and the best mode in which I have contemplated applying that principle so as to distinguish it from other inventions.

The annexed drawings and the following description set forth in detail one mechanical form embodying the invention, such detail construction being but one of various mechanical forms in which the principle of the invention may be employed.

In such annexed drawings, Figure I represents a plan view of two blanks cut or stamped out in carrying out my method of making rakes; Fig. II, a view of a head-blank and braces before welding; Fig. III, a view of the head-blank, braces, and tang after welding and shaping; and Fig. IV, a view of the finished rake.

In carrying out my method I prefer to cut two blanks from a flat bar of metal, as illustrated in Fig. I of the drawings, although one blank may be cut at a time. By cutting the two blanks at one time the teeth of one rake-blank will mesh with the teeth of the other blank and waste of metal will be avoided. The blank severed from the bar consists of the head A and teeth a, and the head is formed with two lugs a', one at each end. When the blank has been cut from the bar, the lugs a' are bent to project at right angles to the head and from the edge of the same, so as to form lugs for welding the braces to the head. The braces B are preferably formed from a rod doubled at its middle and having its arms curved to form the braces and its doubled middle forged to form a tang B'.

I prefer to employ the electric welding process for uniting the braces to the head, and it is with this object in view that I form the blank with the two projecting lugs, so as to form a butt-weld or a scarf-weld instead of a T-weld. The reason for the forming of this butt-weld or scarf-weld is the following: In electric welding the two pieces to be welded are suitably clamped in the terminals of a circuit carrying a current of large volume and of low tension, and the clamp holding the pieces are thereupon brought together with great force, bringing the meeting surfaces of the pieces, which have been heated to welding heat by the current, against each other and uniting them. If T-welds were formed between the heads and the braces, the entire head would require to be heated to welding heat, as the points of the head where the welds are to be made cannot be brought to welding heat without heating the entire head, and this heating would in the meantime partly or entirely burn up the opposite braces. By providing the lugs, however, the head may be so clamped as to lead the current directly to the lugs, and to thus heat the latter to welding heat without heating the entire head. The teeth may be formed and the rake may be finished in any suitable or desired manner, said steps forming no part of the present invention.

Other modes of applying the principle of my invention may be employed for the mode herein explained. Change may therefore be made as regards the mechanism herein set forth, provided the principles of construction respectively recited in the following claims are employed.

I therefore particularly point out and distinctly claim as my invention—

1. The improvement in the method of making rakes, which consists in forming the head with lugs projecting from the edge of the head and thereupon welding the braces to said lugs, substantially as set forth.

2. The method of making rakes, which consists in first forming the ends of the head with lugs, then bending said lugs at an angle to the edge of the head, and finally welding the braces to said lugs, substantially as set forth.

3. The method of making rakes, which consists in forming the head with lugs projecting from its edge, doubling a rod to form braces, forging the doubled portion of the rod to form the tang, and welding the ends of the braces to the lugs upon the head, substantially as set forth.

In testimony that I claim the foregoing to be my invention I have hereunto set my hand this 13th day of November, A. D. 1891.

WARREN H. COWDERY.

Witnesses:
F. C. BAIL,
EDWD. FAWL.